(12) United States Patent
Yeap et al.

(10) Patent No.: US 7,657,327 B2
(45) Date of Patent: Feb. 2, 2010

(54) REMOTE CONTROLLER FOR PORTABLE ELECTRONIC DEVICE

(75) Inventors: Kok Eng Yeap, Penang (MY); Hiroshi Kimoto, Tokyo (JP)

(73) Assignees: Sony EMCS (Malaysia) SDN. BHD., Kula Lumpur (MY); Sony Corporation, Tokyo (JP)

( * ) Notice: Subject to any disclaimer, the term of this patent is extended or adjusted under 35 U.S.C. 154(b) by 454 days.

(21) Appl. No.: 11/202,011

(22) Filed: Aug. 11, 2005

(65) Prior Publication Data

US 2006/0036334 A1 Feb. 16, 2006

(30) Foreign Application Priority Data

Aug. 13, 2004 (MY) .............................. PI 2004 3313

(51) Int. Cl.
*G05B 15/00* (2006.01)

(52) U.S. Cl. .......................................... 700/1; 345/156

(58) Field of Classification Search ..................... 700/1; 345/156

See application file for complete search history.

(56) References Cited

U.S. PATENT DOCUMENTS 7,161,578 B1 * 1/2007 Schneider .................... 345/156

FOREIGN PATENT DOCUMENTS

JP 2002-093142 A * 3/2002

* cited by examiner

*Primary Examiner*—Albert DeCady
*Assistant Examiner*—Tejal Gami
(74) *Attorney, Agent, or Firm*—Frommer Lawrence & Haug LLP; William S. Frommer; Thomas F. Presson

(57) ABSTRACT

A control device for operating electronic equipment having a generally elongated body and rotatable selection portion that is rotatable to any one of a plurality of operation mode positions. A display unit displays information associated with each mode, and a single common actuator activates the selected mode. The display unit may include a curved window that extends at least 180 degrees around the body.

4 Claims, 3 Drawing Sheets

REMOTE CONTROLLER FOR PORTABLE ELECTRONIC DEVICE

The present invention relates to a control device for operating electronic equipment, and in particular, although not exclusively, relates to a remote controller for operating a Sony Walkman, music player or like personal electronic device. Such remote controllers are normally incorporated in the cable of a headset for the personal electronic device and designed to be clipped to the user's clothing for convenient access.

BACKGROUND TO THE INVENTION

There are many such control devices currently on the market. With these control devices it is usual to select a mode such as "menu", "display", "sound" or "play" by pressing a digital button. A separate digital button is typically provided for each of the modes. The display means of the prior art devices is normally a flat LCD screen window which is fixed into position with the use of adhesive.

A device of the above general type is known from Japanese Laid-Open Patent Application Publication No. JP-A-2002-93142, from which FIGS. 5 and 6 herein are taken. In such devices, the display window comprises a frame carrying a window portion that has to be fixed to the device body by adhesive. With increasing miniaturization, and having only the narrow frame portion to which adhesive can be applied, it becomes increasing difficult to properly secure the window. As such, the window becomes prone to be lifted up and finally detached from the device body after extended use. Furthermore, the provision of a set of dedicated mode buttons, as seen in FIG. 6, for the various functions hinders miniaturization, requires a large number of components and hence longer assembly time, as well as making operation more complicated for the user. According to a related art, even the alternative of a common mode selection button that is repeatedly pressed to cycle through a list of modes, also disadvantageously requires the user to pay attention to the display so as to know the current mode selected. Hence, operation of such devices is overly complicated, their assembly in manufacture is fiddly and time-consuming, while their structure is vulnerable to breakage.

It is thus an object of the present invention to make improvements in the prior art devices that address or at least alleviate some of the above problems and/or to provide a useful alternative to known devices.

SUMMARY OF THE INVENTION

In accordance with one aspect of the invention there is provided a control device for operating electronic equipment including:

selection means selectively movable to each of a plurality of operating mode positions, display means for displaying information associated with each mode, and activation means for activating the selected mode.

In accordance with another aspect of the invention there is provided a control device for operating electronic equipment including generally elongated body means housing a display window, wherein the display window is in the form of a curved surface extending at least 180 degrees around the body means.

In accordance with a further aspect of the invention there is provided a control device for operating electronic equipment, the device including generally elongated body means, rotatable selection means rotatable to any one of a plurality of operation mode positions, display means for displaying information associated with each mode, and a single common activating means for activating the selected mode.

In a preferred arrangement the single common activating means is a button switch.

The display means is preferably in the form of window means housed by the body means, said window being in the form of a curved surface extending at least 180 degrees around the body means. In a preferred arrangement the window extends up to approximately 270 degrees around the body means and is generally circular in cross section. An angle in the range of about 180 to about 270 degrees in preferred. The display window preferably forms a structural component of the body means to provide strength and/or rigidity to the body.

Preferably, the window means is mechanically mounted to the body means without the use of adhesive.

In a yet further aspect, the invention provides a control device comprising a generally cylindrical-shaped body, a display extending along the length of said body, and a window covering the display, characterized in that the window forms part of the cylindrical structure of said body and subtends an angle of 180 degrees or more about the longitudinal axis of said body.

In still another aspect, the invention provides a control device comprising a generally cylindrical-shaped body and having a display and user controls, characterized by the user controls comprising a rotatable mode selection knob disposed at one end of said body and having markings that identify multiple knob positions corresponding to different operation modes of the device, and an activation button adjacent said knob for activating a function selected by the knob.

According to certain aspects of the invention, a wider and stronger display window is achieved by adopting a part cylindrical or tubular structure for the window. This not only provides an inherently stronger structure than the conventional flat plate, but also allows a new method of assembly for the control device. Especially, the curved window may be assembled relative to the device body in a simple sliding action in the longitudinal direction of the body, and then held in place mechanically, for example by clip, snap-lock and other measures within the competence of a personal of ordinary skill in the art, without the need for adhesive. Thus, the assembly process is simplified and speeded up. Moreover, the curved window forms part of the body structure, so the final product becomes stronger and more resilient to shock. This is important as there is tendency for the user to touch the window in normal use. With a tubular window in accordance with the invention, any force applied to the window, in the direction of arrow Z in FIG. 2, is transmitted to the wall of the body without being transferred to the delicate display, as can happen with prior art flat windows. So, the display is better protected. The construction of the invention can also help in reducing the risk of damaging ESD (electrostatic discharge).

According to other aspects of the invention, the need for a dedicated set of mode buttons is eliminated, which saves components and frees space for greater miniaturization and/or increasing the window size, both of which are desirable to the user. Device size reduction can be done without compromising functionality in any way. Additional functions can be incorporated in later models simply by changing the jog dial to one having more positions. This avoids significant re-design such as would be necessary to accommodate extra mode buttons. Valuable space is also conserved by the control of the invention, so adding more functions may not require increasing the overall size of the device.

Preferably, the selection means takes the form of a jog-dial control. While the use of a jog-dial as for example a volume control is known from JP-A-2002-93142, the prior art known to the applicant does not show or suggest using a jog-dial as a mode selection means in conjunction with an activation button.

The use of a jog dial control for mode selection greatly simplifies operation for the user. In particular, it provides an immediate, intuitive operation as the mode selected is associated directly with the analogue position of the jog dial, which is readily seen by the user. There is also no need for repeated pushing of a mode select button while simultaneously checking the display to ascertain the current mode at each push, as per the above-mentioned related art.

BRIEF DESCRIPTION OF THE DRAWINGS

In order that the invention may be more readily understood an embodiment of the invention will now be described, by way of example only, with reference to the following drawings, in which.

DESCRIPTION OF A PREFERRED EMBODIMENT

Figure 1:
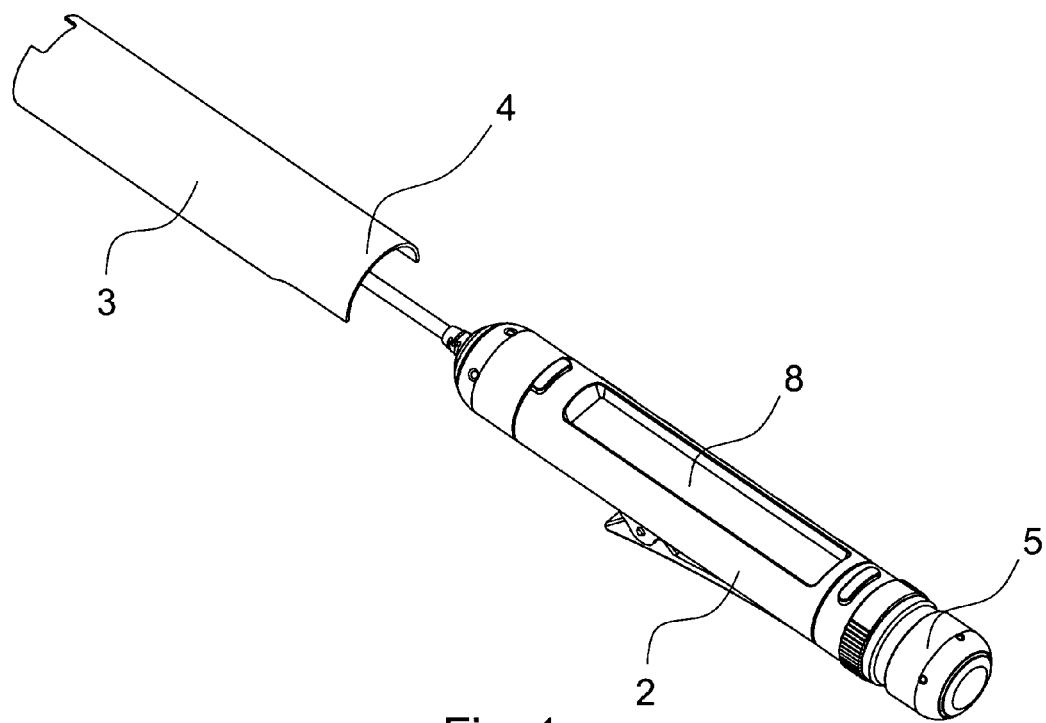
FIG. 1 is an exploded perspective view of a remote controller constructed in accordance with this invention, that shows the method of assembly.

Referring first to FIG. 1, a remote control device 1 for operating a Sony Walkman or the like has an elongated and generally cylindrical shaped body 2 which is adapted to house a display window 3 over LCD display 8. The display window 3 is fed into the elongated body 2 in the direction of arrow X, and one end 4 of the window is received in a correspondingly shaped recess (not shown) adjacent one end 5 of the body 2.

Figure 2:
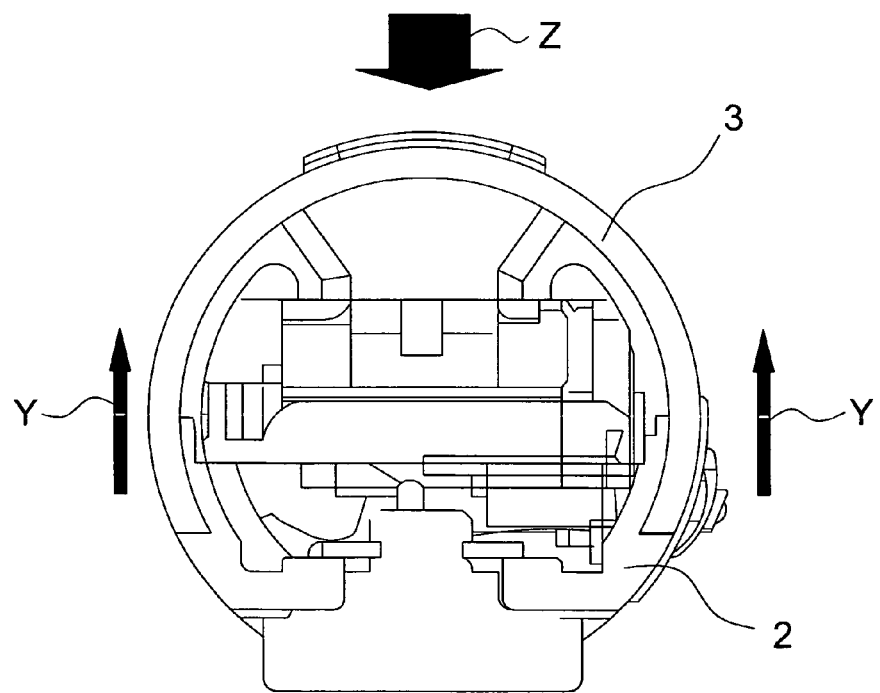
FIG. 2 is an enlarged cross sectional view of the remote controller of FIG. 1.

As best seen in FIG. 2, the display window 3 is circular in cross-section and extends approximately 270 degrees around the cylindrical body. The window 3 forms a structural component of the body to provide strength and rigidity to the remote control device 1. Additionally, when the angle subtended by the window 3 exceeds 180 degrees, it becomes much harder to forcibly dismantle the window in the direction of the arrows Y in FIG. 2.

Figure 3:
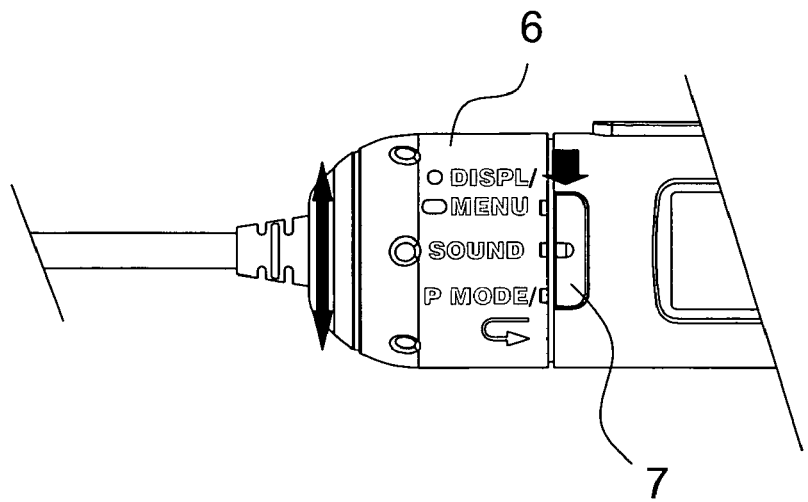
FIGS. 3 and 4 are an enlarged part side view and part perspective view of the remote controller of FIG. 1 that show mode selection controls.
Figure 4:
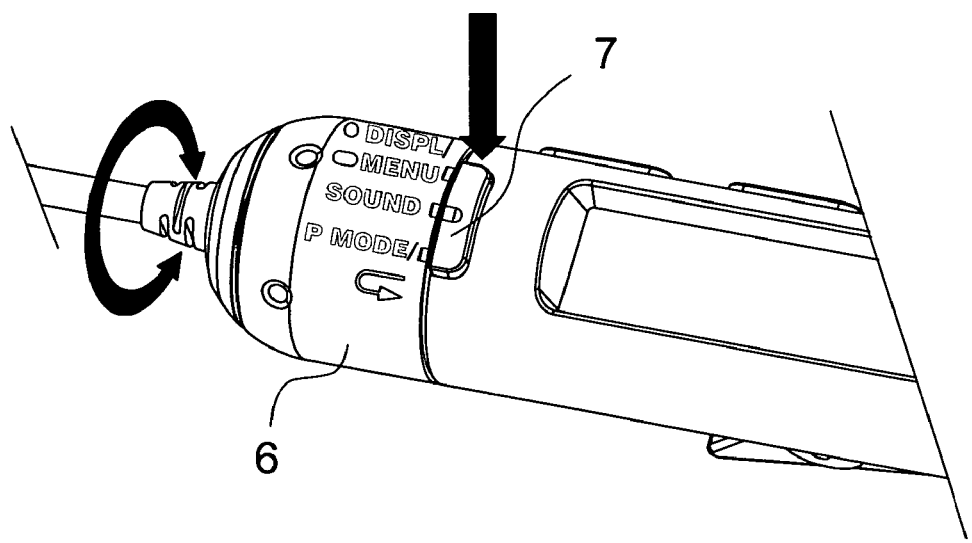
Figure 5:
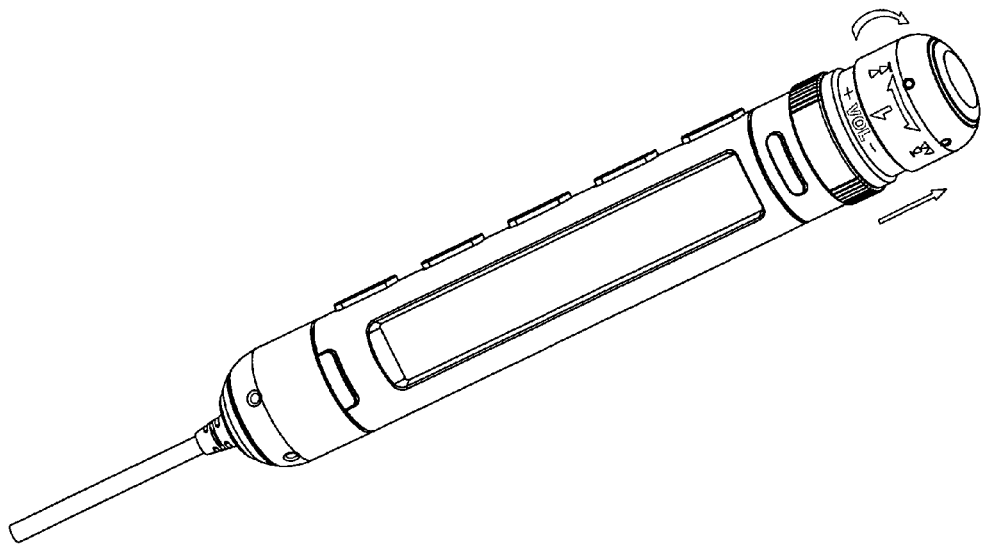
FIGS. 5 and 6 are two perspective views of a prior art remote controller, according to JP-A-2002-93142.
Figure 6:
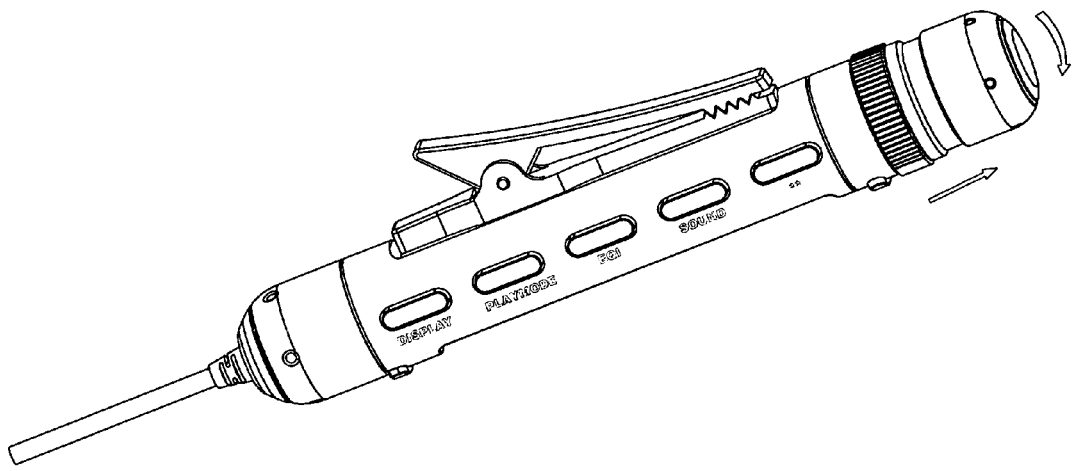

Referring to FIGS. 3 and 4, a rotatable selection means in the form of a jog dial 6 can be rotated to select any one of the modes "display", "menu", "sound" or "play", for example. Once a mode is selected by rotating the jog dial 6, the mode is activated or confirmed by pressing button switch 7. The single common button switch 7 is utilized to serve as the activator for all the mode positions. It prevents the mode from being changed unintentionally if the jog dial is accidentally nudged during use.

As seen in FIGS. 3 and 4, in this embodiment, the button switch 7 is elongate and extends in the circumferential direction of body 2. It is positioned axially adjacent the jog dial ring 6. This arrangement conserves space and allow the controls 6, 7 to be at an axially separate location with respect to the display 8. While the ring 6 is rotated about the device's longitudinal axis, button 7 is pressed in a radial direction.

Prior art flat screens are normally fixed in position by the use of adhesive around the perimeter of the screen. This need for adhesive takes up space and this effectively reduces the size of the available screen. Unfortunately, simply reducing the adhesive area increases the likelihood of the screen coming loose. The embodiment of the present invention dispenses with the need for adhesive and the above resultant loss of screen space. Furthermore, the mechanical construction of attaching the screen to the body tends to be more secure than using adhesive.

The curved, circular surface of the screen 3 of the embodiment provides a more pleasing or alternative appearance to the usual flat screens of the prior art.

The curved screen 3 also provides structural rigidity to the device, even with a thickness of about 0.8 mm. A substantially cylindrical type screen 3 will tend to be stronger than a flat screen of the same thickness of screen material.

Prior art devices such as that of JP-A-2002-93142 utilize a separate button switch for each of the different modes. The use of the jog dial 6 and common switch 7 for confirmation/activation dispenses with the need for all these switches, and this can result in reduced manufacturing costs, and saving of space to make way for a smaller and more compact device. Alternatively, the space saving can be utilized for introducing additional or improved features, such as a larger screen area.

The jog dial system is much easier and more convenient to operate than the prior art plurality of button switches. It is relatively easy to operate with one hand. The user of the prior at devices normally needs to verify the current operation mode by looking at the LCD display, whereas with the jog dial of the present invention it is possible to verify and activate the mode intuitively by the "feel" of the jog dial and button switch and simple viewing of the jog dial knob markings.

Of course, it will be understood that various changes can be made to the above example without departing from the scope of the invention, which is defined in the following claims.

The invention claimed is:

1. A control device for operating electronic equipment comprising:
   a connection that connects the control device with ma external apparatus to be controlled by the control device;
   a rotational operation unit that selects a rotational position from a plurality of rotational positions, wherein each rotational position corresponds to a predetermined control process;
   an operation unit;
   a display unit that displays information associated with a control process corresponding to the selected rotational position of the rotational operation unit;
   a control unit that executes said control process corresponding to the selected rotational position when the operation unit is activated, wherein the rotational operation unit, the operation unit, and the connection unit are disposed in proximity at a same end of the control device;
   an elongated housing which contains said control unit;
   a display window, wherein the display window is in the form of a curved surface which is adjusted to the outside of the elongated housing;
   wherein the display window extends approximately 270 degrees around the housing; and
   wherein the rotational operation unit in conjunction with the operation unit switches the electronic equipment among a plurality of operation modes so that a dedicated set of buttons for the plurality of operation modes are removed from the control device, the operation modes including a display mode, a menu mode, a sound mode, and a play mode, and wherein a selection of an operation mode requires:
   switching the rotational operation unit to a different rotational position, and pressing the operation unit to provide a confirmation to the control unit.

2. The control device for operating electronic equipment according to claim 1, wherein said display window is attached by a sliding mechanism.

3. The control device for operating electronic equipment according to claim 1, wherein the operation unit is disposed adjacent to the display unit.

4. The control device for operating electronic equipment according to claim 1, wherein the control unit is a button switch.

* * * * *

UNITED STATES PATENT AND TRADEMARK OFFICE
CERTIFICATE OF CORRECTION

PATENT NO. : 7,657,327 B2 Page 1 of 1
APPLICATION NO. : 11/202011
DATED : February 2, 2010
INVENTOR(S) : Yeap et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Twenty-eighth Day of December, 2010

David J. Kappos
*Director of the United States Patent and Trademark Office*